United States Patent [19]  [11] 4,427,622
Knecht et al.  [45] Jan. 24, 1984

[54] ALIGNMENT TOOL FOR SPACERS OF NUCLEAR REACTOR FUEL ASSEMBLIES

[75] Inventors: Klaus Knecht; Georg Gebhard; Franz Rohr, all of Erlangen, Fed. Rep. of Germany

[73] Assignee: Kraftwerk Union Aktiengesellschaft, Mülheim, Fed. Rep. of Germany

[21] Appl. No.: 298,291

[22] Filed: Sep. 1, 1981

[30] Foreign Application Priority Data

Sep. 4, 1980 [DE] Fed. Rep. of Germany ....... 3033349

[51] Int. Cl.$^3$ .......................... G21C 3/34; B21J 13/08
[52] U.S. Cl. .................................... 376/260; 376/262; 376/446; 72/458
[58] Field of Search ................................ 376/260–262, 376/446, 442, 462, 463; 72/458, 479

[56] References Cited

U.S. PATENT DOCUMENTS

| 3,892,027 | 7/1975 | Jabsen | 376/446 |
| 3,894,327 | 7/1975 | Jabsen | 376/446 |
| 3,982,994 | 9/1976 | Jabsen | 376/446 |
| 4,175,000 | 11/1979 | Jabsen | 376/446 |
| 4,208,248 | 7/1980 | Jabsen | 376/446 |
| 4,292,130 | 9/1981 | Viaud et al. | 376/446 |

Primary Examiner—Sal Cangialosi
Attorney, Agent, or Firm—Herbert L. Lerner; Laurence A. Greenberg

[57] ABSTRACT

Alignment tool for the remotely controlled recalibration of resilient protruding contact dimples or springs in substantially square spacer grid meshes of nuclear reactor fuel assemblies, including an outer centering tube adapted to the cross section of a spacer mesh and rigid and resilient contact dimples protruding into the interior of the mesh in given directions, the outer centering tube having a window formed therein in the vicinity of the contact dimple, a gripper-actuating tube being concentrically surrounded by and axially movable within the outer centering tube, a pendulum rod having a free end and being disposed in the interior of the gripper-actuating tube and being axially fixed relative to the gripper-actuating tube and able to oscillate in the given protrusion direction of the resilient contact dimple to be recalibrated, a gripper attached to the free end of the pendulum rod, a restoring spring for exerting pressure on the gripper, and a run-on incline formed on the pendulum rod being engageable with the gripper-actuating tube over and above the contact dimple for radial displacement of the gripper against the pressure of the restoring spring.

9 Claims, 5 Drawing Figures

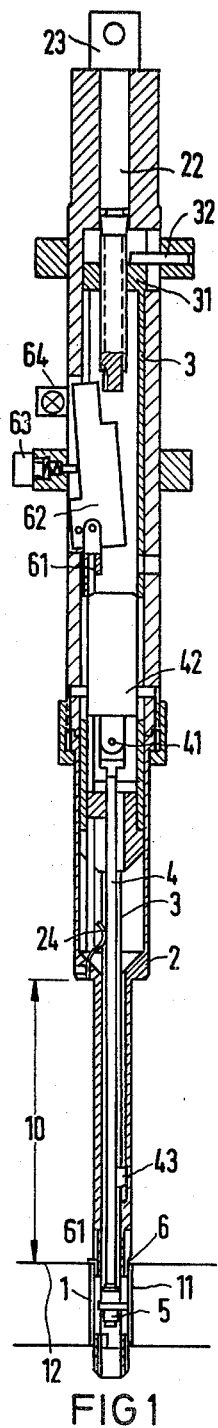
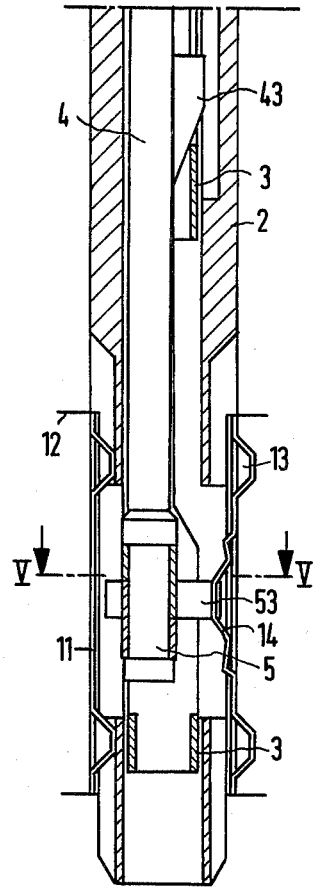
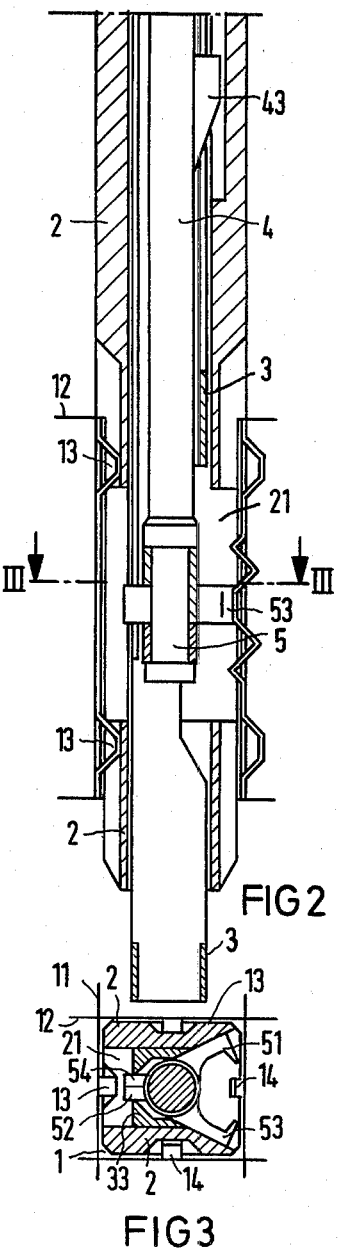
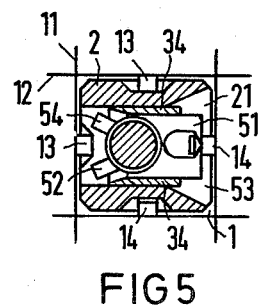
FIG 1  FIG 4  FIG 2
FIG 5  FIG 3

ALIGNMENT TOOL FOR SPACERS OF NUCLEAR REACTOR FUEL ASSEMBLIES

The present invention relates to an alignment tool for the remotely-controlled recalibration of the elastic or resilient contact dimples, or so-called contact springs, in the square meshes of the spacer grids of nuclear reactor fuel assemblies. As is well known, the spacer grids serve the purpose of continuously holding the multiplicity of fuel rods of a fuel assembly at an exact mutual distance and of making the mechanical construction of the holding structure such that the fuel rods are practically prevented from being excited to vibrations by the coolant flowing past. Such a spacer holding construction is described, for instance, in German Published Non-Prosecuted Application DE-OS No. 15 89 051 which also shows the basic principle of so-called three-point support clearly and unequivocally.

With this three-point support, the fuel rod rests in the axial direction against fixed contact dimples disposed on top of each other, and is pressed against the latter by a springy contact dimple.

For secure clamping, a defined spring force is necessary. The force can be decreased by mechanical damage or other influences to the extent that the fuel rod is insufficiently held, which may in some circumstances lead to damage of the fuel rod.

A fuel assembly, in which individual contact springs are bent out of shape, can be continued in operation only if the fuel rod held by these elements is removed and replaced by a solid rod, which therefore contains no nuclear fuel.

Another possibility would be to bring the damaged contact spring back into its original position, so that proper holding of the fuel rod used until then, or of a newly to be introduced fuel rod is thereby assured.

It is accordingly an object of the invention to provide an alignment tool for spacers of nuclear reactor fuel assemblies, which overcomes the hereinbefore-mentioned disadvantages of the heretofore-known devices of this general type.

With the foregoing and other objects in view there is provided, in accordance with the invention, an alignment tool for the remotely controlled recalibration of resilient protruding contact dimples or springs in substantially square spacer grid meshes of nuclear reactor fuel assemblies, comprising an outer centering tube adapted to fit the cross section of a spacer mesh and taking into consideration rigid and resilient contact dimples protruding into the interior of the mesh in given directions, the outer centering tube having a window formed therein in the vicinity of the contact dimple, or a plier gripper-actuating centering tube being concentrically surrounded by and axially movable within the outer centering tube, a pendulum rod having a free end and being disposed in the interior of the gripper-actuating tube and being axially fixed relative to the gripper-actuating tube and able to oscillate in the given protrusion direction of the resilient contact dimple to be recalibrated, a gripper attached to the free end of the pendulum rod, a restoring spring for exerting pressure on the gripper, and a run-on incline formed on the pendulum rod being engageable with the gripper-actuating tube over and above the contact dimple for radial displacement of the gripper against the pressure of the restoring spring.

The basic principle of this aligning tool is therefore that a gripper grips the bent-out-of-shape spacer dimple or spring and pulls it back into the interior of the mesh. This aligning tool is remotely controlled since this operation which becomes necessary, preferably in the case of irradiated fuel assemblies, must be carried out while being shielded by water in the fuel pit of a nuclear power station. Most readily accessible are those spacer grids which are adjacent to the head or the base of the fuel assembly. By appropriate lengthening of the active parts of this alignment tool, i.e. the positioning mechanism of the gripper, it is likewise possible to reach the further spacer grids of the fuel assembly. The adjacent fuel rods can always be left in place.

In accordance with another feature of the invention, wherein the pendulum rod includes or serves as a fulcrum for the gripper, and the gripper includes gripper jaws which grip the contact dimple on one side of the gripper and form rearward gripper extensions on the other side thereof.

In accordance with a further feature of the invention, there are provided template surfaces formed on the gripper-actuating tube being axially displaceable for engagement with the gripper jaws for closing the gripper, or extension for opening the gripper.

In accordance with an added feature of the invention, there is provided a threaded nut terminating the gripper-actuating tube, and a remotely-controllable threaded spindle engaging the gripper-actuating tube for axially moving the gripper-actuating tube, the gripper-actuating tube being secured against rotation.

In accordance with an additional feature of the invention, there is provided a locking pawl for the threaded spindle, and a stop pin guided in the outer centering tube for swinging out the locking pawl, the threaded spindle being secured against rotation by the locking pawl until the locking pawl is swung out by the stop pin after reaching a given exact operating position in the spacer grid.

In accordance with again another feature of the invention, there is provided an operating side of the alignment tool, a monitoring switch optically or acoustically indicating the position of the locking pawl toward the operating side of the alignment tool.

In accordance with again a further feature of the invention, there is provided an operating side and an upper end of the alignment tool, and a coupler disposed at the upper end of the operating side for lengthening with a handwheel and for a revolution counter.

In accordance with a concomitant feature of the invention, the length of the outer centering tube has a profile corresponding to the spacer mesh and is adapted to the position or distance of the spacer grids to be seized.

Other features which are considered as characteristic for the invention are set forth in the appended claims.

Although the invention is illustrated and described herein as embodiments in alignment tool for spacers of nuclear reactor fuel assemblies, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic cross-sectional view of the alignment tool of the invention, in condition for placement on a spacer mesh;

FIG. 2 is an enlarged view similar to FIG. 1, but modified in certain respects;

FIG. 3 is a cross-sectional view of FIG. 2 taken along the line III—III thereof in the direction of the arrows;

FIG. 4 is a view similar to FIG. 2 including further modifications; and

FIG. 5 is a view similar to FIG. 3, taken along the line V—V in FIG. 4, in the direction of the arrows.

The invention includes the actuating mechanism for the gripper, the extension of this tool for the purpose of remote control within the fuel pit having been omitted. In practice, the tool merely includes a stationary, put-on or centering tube and a shaft guided therein which is rotated from the operating side either to the left or to the right. In order to always adjust the gripper accurately and reproducibly, a counting mechanism which is known, is also provided.

Referring now to the figures of the drawing as a whole, it is seen that FIG. 1 shows the aligning tool in a cross section and specifically in a condition where it is placed on a spacer mesh, whereas FIG. 2 shows this spacer mesh in an enlarged condition, with rigid and resilient contact dimples 13 and 14, and a gripper 53 being open. The contact spring 14 is bent out of shape and is no longer suitable for holding a fuel rod.

In FIG. 4, on the other hand, the gripper 53 is closed and has pulled back the contact spring 14 into its original position. FIGS. 3 and 5 show the gripper and the alignment tool in a cross section at the height of the gripper.

German Published Non-Prosecuted Application DE-OS No. 15,89,051 mentioned hereinafore provides detailed information regarding the construction of a spacer grid, so that only one mesh of this grid 1 is shown herein. This spacer mesh includes sheet metal webs 11 and 12 which cross each other, and are equipped, in accordance with the afore-mentioned state of the art, with rigid contact dimples 13 and resilient contact dimples, i.e. contact springs 14.

The aligning tool includes a centering tube 2, which corresponds to the cross section of the spacer mesh, as far as the section 10 thereof which engages the fuel assembly is concerned, taking into consideration the rigid and resilient contact dimples protruding into its interior; in this connection FIGS. 3 and 5 should also be seen. This centering tube 2 is provided, in the region thereof opposite the contact spring 14 to be aligned, with a window 21 which extends all of the way through, and is seated with a shoulder 6 on the spacer webs 11 and 12. The position of the gripper 5 which includes two gripper jaws 51 and 53 rotatably supported in one plane, is determined relative to the contact spring 14 which is to be aligned.

In view of the great length of the aligning tool including its non-illustrated extension, this seating might be inaccurate due to canting of the tool. For th sake of safety a stop pin 61 is therefore provided which releases the motion mechanism of the alignment tool after the desired position is reached, and thereby not only ensures its operation but also prevents further damage that might otherwise be possible. To this end, this stop pin 61 actuates a latching pawl 62 which, in the manner shown, swings out of a slot in a threaded spindle 22 that serves for moving the gripper, etc. The locked position of this pawl 62 is brought about by the restoring spring 63, and the open position is indicated optically or acoustically to the operating side above the water level of the fuel pit, by a monitoring switch 64. This monitoring switch can, for instance, be a contactless switch acting in accordance with the induction principle.

The active parts of this alignment tool are disposed within this centering tube 2. These parts include first a pendulum rod 4 with the gripper 5 attached to the free end thereof, as well as a gripper-activating tube 3 which can be moved in the axial direction. The pendulum rod 4 is rotatably supported at a joint 41 on a fastening member 42 which is rigidly connected to the centering tube 2. This joint 41 is disposed in such a way that the pendulum rod 4 and therefore also the gripper 5 can be moved perpendicularly to the mesh wall carrying the contact spring 14. The normal position occupied when the tool is inserted, i.e. if the gripper is open as seen in FIG. 3, is ensured by the restoring spring 24.

The gripper-actuating tube 3 which surrounds the pendulum rod 4 with spacing therebetween, is provided in order to move this pendulum rod 4 as well as the gripper 5. This tube 3 is moved up and down by the afore-mentioned threaded spindle 22 by rotating the same; for this purpose the tube terminates in a threaded nut 31 and is supported against rotation in the centering tube 2 by its substantially rectangular form in the region of the spacer grid. While in FIG. 1, the top or highest position of this gripper-actuating tube is shown, and an adjustable stop 32 is provided for this purpose, FIG. 2 shows the lowest position thereof, as is necessary when the tool is inserted in the spacer grid mesh. It can be seen from FIGS. 2 and 3 that the gripper actuating tube 3 is slotted in this region and that, due to the shape of these slots, starting surfaces are provided which hold the gripper 5 in the open position.

The gripper 5 itself includes the two gripper claws or jaws 51 and 53 which, on the other side of the fulcrum on the pendulum rod 4, become rearward gripper extensions 52 and 54. Due to the form of the gripper-actuating tube 3 and axially displaceable template surfaces 33, 34 shown in FIGS. 3 and 5 which contact the jaws 51, 53 or extensions 52, 54, these gripper extensions 52 and 54 are pressed together so that they are forced to occupy the open position according to FIG. 3.

The operating cycle of the tool is as follows:

If the tool is placed on the grid mesh, the locking pawl 62 is swung out of the slot of the threaded spindle 22, so that through rotation thereof the gripper-actuating tube 3 is pulled upward through the coupler 23 and the non-illustrated remote-controlled linkage, such as to a handwheel and revolution counter. Through the change of the cross section or the run-on surface of the gripper-actuation tube 3 as seen in FIG. 5, the claws 51 and 53 are pressed together and grip the deformed spacer spring 14. The rearward gripper extensions 52 and 54 are free in this operation. By further lifting, through the rotation of the threaded spindle 22 of the gripper-actuating tube 3, the tube 3 comes into engagement with a run-on incline 43 at the pendulum rod 4, which protrudes through a slot in the gripper-actuating tube 3, as seen in FIG. 4, and pushes the pendulum rod 4 including the closed gripper away from its starting position and therefore pulls the gripped spring 14 into the normal position.

After this operation is completed, the spindle 22 is rotated toward the other side, while the gripper-actuating tube 3 is lowered; a restoring spring 24 pushes the pendulum rod 4 into the starting position; subsequently the gripper 5 is opened because the run-on surfaces of the gripper-actuating tube 3 again come into engagement with the rearward gripper extensions 52 and 54 until the position according to FIG. 3 is finally reached again.

This position of the gripper-actuating tube 3 can be seen from the hereinafore-mentioned counting mechanism for the operation of the threaded spindle 22; the alignment tool can be pulled back again without difficulty from the spacer mesh, while the stop pin 61 again releases the latching pawl 62 and the pawl snaps back into the slot of the threaded spindle 22 with the aid of the spring 63, to prevent a displacement of the gripper-actuating tube from the outside. Only after the tool is again placed on a spacer mesh, in this lock unlatched and can the tool be operated again in its active part or section.

Due to the cycle of the individual operating steps forced into occurrence by the actuating tube 3, the sequence of steps for moving the gripper, and therefore the alignment of the contact spring 14, is assured and erroneous operation is made impossible.

In conclusion it should be mentioned that this alignment tool must be fabricated with the greatest precision since the width of a spacer mesh is in the order of 15 mm and the overall length of the tool up to the water level of the fuel-pit water as well as to the control side, is in the order of magnitude of 10 m. It goes without saying that the principle of the invention shown herein also allows deviations in construction from the embodiment examples shown. This applies in particular to the non-illustrated extension piece for remote control. The forced cycle of motion steps, however, remains the same in all cases. It should furthermore be mentioned that the contact springs of other spacer constructions can also be straightened out again in accordance with this principle.

There are claimed:

1. Alignment tool for the remotely controlled recalibration of resilient protruding contact dimples or springs in substantially square spacer grid meshes of nuclear reactor fuel assemblies, comprising an outer centering tube adapted to the cross section of a spacer mesh and rigid and resilient contact dimples protruding into the interior of the mesh in given directions, said outer centering tube having a window formed therein in the vicinity of the contact dimple, a gripper-actuating tube being concentrically surrounded by and axially movable within said outer centering tube, a pendulum rod having a free end and being disposed in the interior of said gripper-actuating tube and being axially fixed relative to said gripper-actuating tube and able to oscillate in the given protrusion direction of the resilient contact dimple to be recalibrated, a gripper attached to said free end of said pendulum rod, a restoring spring for exerting pressure on said gripper, and a run-on incline formed on said pendulum rod being engageable with said gripper-actuating tube over and above the contact dimple for radial displacement of said gripper against the pressure of said restoring spring.

2. Alignment tool according to claim 1, wherein said pendulum rod includes a fulcrum for said gripper, and said gripper includes gripper jaws which grip the contact dimple on one side of said gripper and form rearward gripper extensions on the other side thereof.

3. Alignment tool according to claim 1, including template surfaces formed on said gripper-actuating tube being axially displaceable for engagement with said gripper jaws for closing said gripper.

4. Alignment tool according to claim 2, including template surfaces formed on said gripper-actuating tube being axially displaceable for engagement with said extension for opening said gripper.

5. Alignment tool according to claim 3 or 4, including a threaded nut terminating said gripper-actuating tube, and a remotely-controllable threaded spindle engaging said gripper-actuating tube for axially moving said gripper-actuating tube, said gripper-actuating tube being secured against rotation.

6. Alignment tool according to claim 5, including a locking pawl for said threaded spindle, and a stop pin guided in said outer centering tube for swinging out said locking pawl, said threaded spindle being secured against rotation by said locking pawl until said locking pawl is swung out by said stop pin after reaching a given exact operating position in the spacer grid.

7. Alignment tool according to claim 6, including an operating side of the alignment tool, a monitoring switch indicating the position of said locking pawl toward said operating side of the alignment tool.

8. Alignment tool according to claim 1, including an operating side and an upper end of the alignment tool, and a coupler disposed at said upper end of said operating side for lengthening with a handwheel and for a revolution counter.

9. Alignment tool according to claim 1, wherein the length of said outer centering tube has a profile corresponding to the spacer mesh and is adapted to the position of the spacer grids to be seized.

* * * * *